US012785350B2

(12) United States Patent
Kawakami et al.

(10) Patent No.: US 12,785,350 B2
(45) Date of Patent: Nov. 3, 2026

(54) DISTRIBUTED OPTICAL AMPLIFIER, DISTRIBUTED OPTICAL AMPLIFIER SYSTEM, AND DISTRIBUTED OPTICAL AMPLIFICATION METHOD

(71) Applicant: NTT, Inc., Tokyo (JP)

(72) Inventors: Hiroto Kawakami, Musashino (JP); Shoichiro Kuwahara, Musashino (JP); Yoshiaki Kisaka, Musashino (JP)

(73) Assignee: NTT, Inc., Tokyo (JP)

( * ) Notice: Subject to any disclaimer, the term of this patent is extended or adjusted under 35 U.S.C. 154(b) by 373 days.

(21) Appl. No.: 18/627,950

(22) Filed: Apr. 5, 2024

(65) Prior Publication Data

US 2024/0258760 A1 Aug. 1, 2024

Related U.S. Application Data

(63) Continuation-in-part of application No. PCT/JP2021/037046, filed on Oct. 6, 2021.

(51) Int. Cl.
*H01S 3/10* (2006.01)
*H01S 3/30* (2006.01)
(Continued)

(52) U.S. Cl.
CPC ........ *H01S 3/1001* (2019.08); *H01S 3/10015* (2013.01); *H01S 3/302* (2013.01);
(Continued)

(58) Field of Classification Search
None
See application file for complete search history.

(56) References Cited

U.S. PATENT DOCUMENTS

| | | | | |
|---|---|---|---|---|
| 2002/0105715 A1 | 8/2002 | Naito et al. | | |
| 2003/0117692 A1* | 6/2003 | Tanaka | ............... | H04B 10/2916 359/334 |
| 2008/0193136 A1 | 8/2008 | Masuda et al. | | |

FOREIGN PATENT DOCUMENTS

| | | |
|---|---|---|
| JP | 05275792 A | 10/1993 |
| JP | 2002122897 A | 4/2002 |

(Continued)

OTHER PUBLICATIONS

Hiroto Kawakami, et al., Gain Instability in Forward-Pumped Raman Amplifier and Its Suppression Utilizing a Dual-Arm Depolarizer for Pump Light, ECOC2020, 2020.

(Continued)

*Primary Examiner* — Eric L Bolda
(74) *Attorney, Agent, or Firm* — Harness, Dickey & Pierce, P.L.C.

(57) ABSTRACT

An aspect of the present invention is a distributed optical amplifier which includes: a pump light generator which generates pump light for optically exciting an optical transmission line; and a multiplexer which multiplexes n kinds (n is a positive integer) of light to be amplified and the pump light output from the pump light generator, and outputs the multiplexed light to the optical transmission line. When a center wavelength of the n kinds of light to be amplified is denoted as $\lambda_{S1}$ to $\lambda_{Sn}$ and a zero-dispersion wavelength of the optical transmission line is denoted as $\lambda_0$, intensity of the pump light generated by the pump light generator is suppressed at n kinds of wavelengths represented by $2\times\lambda_0-\lambda_{S1}$ to $2\times\lambda_0-\lambda_{Sn}$ in comparison to intensity of other wavelengths of the pump light generated by the pump light generator.

11 Claims, 12 Drawing Sheets

(51) Int. Cl.
*H04B 10/2525* (2013.01)
*H04J 14/02* (2006.01)

(52) U.S. Cl.
CPC ...... *H04B 10/2525* (2013.01); *H04J 14/0221* (2013.01); *H04B 2210/25* (2013.01)

(56) References Cited

FOREIGN PATENT DOCUMENTS

| | | | |
|---|---|---|---|
| JP | 2002229084 | A | 8/2002 |
| JP | 2003-188449 | A | 7/2003 |
| WO | WO-2006001229 | A1 | 1/2006 |

OTHER PUBLICATIONS

C. R. S. Fludger, et al., Pump to Signal RIN Transfer in Raman Fiber Amplifiers, Journal of Lightwave Technology, vol. 19, No. 8, Aug. 2001.

* cited by examiner

DISTRIBUTED OPTICAL AMPLIFIER, DISTRIBUTED OPTICAL AMPLIFIER SYSTEM, AND DISTRIBUTED OPTICAL AMPLIFICATION METHOD

CROSS-REFERENCE TO RELATED APPLICATIONS

This application is a Continuation-In-Part of International Application No. PCT/JP2021/037046, filed Oct. 6, 2021. The entire disclosure of the above application is incorporated herein by reference.

TECHNICAL FIELD

The present invention relates to techniques of a distributed optical amplifier, a distributed optical amplifier system, and a distributed optical amplification method.

BACKGROUND ART

In design of high-speed and large-capacity distributed optical amplifier systems, it is important to reduce an SN degradation of received signals caused due to transmission line loss. Therefore, various configurations in which optical amplification is performed on the optical transmission line itself to compensate for the transmission line loss have been devised. Among them, distributed Raman amplification has the great advantage of using already installed optical fibers as a gain medium, and is therefore expected to be applied to high-speed and large-capacity optical communication of the next generation.

FIG. 10 shows the configuration of a distributed optical amplifier system using the distributed Raman amplification. Since bidirectional pumping is assumed here, the optical transmission line is forward-pumped by a pump light output from pump light source for forward-pumping, and is backward-pumped by another pump light output from pump light source for backward-pumping.

Signal light is sent from an optical transmitter. In the case of Raman amplification, a wavelength of pump light is shorter than a wavelength of signal light by about 100 nm. Since the Raman amplification in the optical fiber has a wide gain band, the wavelength difference of 100 nm is not so strict, and the gain can be obtained even if the wavelength difference is slightly different.

Generally, because the pump light propagates through the core of the optical transmission line like signal light, in the forward pumping, it is necessary to multiplex the signal light and pump light traveling in the same direction as the signal light. On the other hand, in the backward pumping, there is a need to send out the pump light traveling in an opposite direction to the signal light, and separate only the signal light and send it to the optical receiver. This multiplexing and demultiplexing can be realized by a wavelength multiplexing coupler or a circulator. While the bidirectional pumping has been described in FIG. 10, the pumping direction may be only forward or only backward.

Since the Raman amplification is an optical effect having polarization dependency, the pump light output from the pump light source for forward pumping and the pump light source for backward pumping need to be depolarized. As a specific method for making the depolarized light, for example, a method described in NPL 1 can be used. Although the depolarization is essential, a detailed description thereof will be omitted. The following description of the background technique is based on the premise that the pump light source for forward pumping and the pump light source for backward pumping are subjected to depolarization processing.

When the noise in the pump light cannot be ignored, the noise is transferred to the signal light to be amplified. It is known that noise transfer becomes more remarkable in the forward pumping. This is because the pump light and the signal light propagate in the same direction.

Here, a group velocity $v_s$ of the signal light and a group velocity $v_p$ of the pump light in the optical transmission line are considered. FIGS. 11 and 12 schematically show these group velocities. The group velocity of the light depends on the wavelength and becomes the fastest in the zero-dispersion wavelength. The zero-dispersion wavelength differs depending on the structure of the fiber, and is often designed around 1.3 μm or 1.55 μm, but there are also cases where wavelengths other than these are designed to have the zero-dispersion. In many cases, the wavelength dependence of the group velocity is symmetrical respect to the zero-dispersion wavelength. As described above, since the wavelength of the pump light is about 100 nm shorter than the wavelength of the signal light, the group velocity $v_s$ of the signal light and the group velocity $v_p$ of the pump light in the optical transmission line are generally not the same.

FIG. 11 schematically shows an example in which both the signal light and the pump light have a wavelength longer than that of the zero-dispersion wavelength. Since the pump light has a shorter wavelength than the signal light, $v_p > v_s$ is established. In this case, even if the intensity noise in the pump light source cannot be ignored, transfer of the high frequency component of the noise to the signal light is suppressed.

This is because, even if the intensity of the pump light periodically fluctuates at a high speed, the signal light will receive Raman gain from both the high-power pump light and the low-power pump light when viewed from the signal lights with different group velocities. So then, the signal light ultimately receives an averaged Raman gain.

However, since the time during which the signal light can receive the Raman gain in the course of propagation through the optical transmission line is finite, if the period of the intensity fluctuation of the pump light is long, the above-mentioned averaging is not completely performed, and the Raman gain also fluctuates with time. That is, even if the group velocity of the signal light and the pump light is different, the low-frequency component of the noise in the pump light is transferred to the signal light, and degradation of the signal quality occurs to some extent. The details thereof are disclosed in, for example, in NPL 2.

CITATION LIST

Non Patent Literature

[NPL 1] Hiroto Kawakami, Shoichiro Kuwahara, Yoshiaki Kisaka, Gain Instability in Forward-Pumped Raman Amplifier and Its Suppression Utilizing a Dual-Arm Depolarizer for Pump Light, ECOC2020 Tu1A-5

[NPL 2] C. R. S. Fludger, V. Handerek, Member, IEEE, and R. J. Mears, Associate Member, IEEE, Pump to Signal RIN Transfer in Raman Fiber Amplifiers, JOURNAL OF LIGHTWAVE TECHNOLOGY, VOL. 19, No. 8, AUGUST 2001

SUMMARY OF INVENTION

Technical Problem

However, as shown in FIG. 12, when the intermediate wavelength between the pump light and the signal light is zero-dispersion, attention is required. In this case, since $v_p$ and $v_s$ have values close to each other, the pump light and the signal light propagate through the optical transmission line at the same speed. Therefore, when the intensity noise in the pump light cannot be ignored, the signal light receives the Raman gain only from the high power pump light or only from the low power pump light. It means, the noise in the pump light is transferred to the signal light not only in the low-frequency component but also in the high-frequency component. As described above, the conventional technique has a problem that the quality degradation of the transmitted signal can be extremely increased.

In view of the above circumstances, an object of the present invention is to provide a technology that can suppress quality degradation of the transmitted signal associated with the distributed optical amplifier.

Solution to Problem

An aspect of the present invention is a distributed optical amplifier including: a pump light generator which generates pump light for optically exciting an optical transmission line; and a multiplexer which multiplexes n kinds (n is a positive integer) of light to be amplified and the pump light output from the pump light generator, and outputs the multiplexed light to the optical transmission line, wherein, when a center wavelength of the n kinds of light to be amplified is denoted as $\lambda_{S1}$ to $\lambda_{Sn}$ and a zero-dispersion wavelength of the optical transmission line is denoted as $\lambda_0$, intensity of the pump light generated by the pump light generator is suppressed at n kinds of wavelengths represented by $2\times\lambda_0-\lambda_{S1}$ to $2\times\lambda_0-\lambda_{Sn}$ in comparison to intensity of other wavelengths of the pump light generated by the pump light generator.

An aspect of the present invention is a distributed optical amplifier system including an optical transmitter which transmits n kinds (n is a positive integer) of signal light, a distributed optical amplifier which amplifies the signal light transmitted by the optical transmitter in an optical transmission line as light to be amplified, and an optical receiver which receives the signal light amplified by the distributed optical amplifier, wherein the distributed optical amplifier includes a pump light generator which generates pump light for optically exciting the optical transmission line; and a multiplexer which multiplexes n kinds of light to be amplified and the pump light output from the pump light generator, and outputs the multiplexed light to the optical transmission line, and wherein, when a center wavelength of the n kinds of light to be amplified is denoted as $\lambda_{S1}$ to $\lambda_{Sn}$ and a zero-dispersion wavelength of the optical transmission line is denoted as $\lambda_0$, intensity of the pump light generated by the pump light generator at n kinds of wavelengths ranging from $2\times\lambda_0-\lambda_{S1}$ to $2\times\lambda_0-\lambda_{Sn}$ is suppressed in comparison to intensity of other wavelengths of the pump light generated by the pump light generator.

An aspect of the present invention is a distributed optical amplifier system including an optical transmitter which transmits n kinds (n is a positive integer) of signal light, a distributed optical amplifier which amplifies the signal light transmitted by the optical transmitter in an optical transmission line as light to be amplified, and an optical receiver which receives the signal light amplified by the distributed optical amplifier, wherein the distributed optical amplifier includes a pump light generator which generates pump light for optically exciting an optical transmission line; and a multiplexer which multiplexes n kinds of light to be amplified and the pump light output from the pump light generator, and outputs the multiplexed light to the optical transmission line, wherein the optical transmission line from the distributed optical amplifier to the optical receiver is configured by connecting a plurality of optical waveguides having different wavelength dispersions in columns, and wherein, when a center wavelength of the n kinds of light to be amplified is denoted as $\lambda_{S1}$ to $\lambda_{Sn}$ and a zero-dispersion wavelength of the optical waveguide at which intensity of the propagating pump light is the highest among the plurality of optical waveguides is denoted as $\lambda_{0in}$, intensity of the pump light at n kinds of wavelengths ranging from $2\times\lambda_{0in}-\lambda_{S1}$ to $2\times\lambda_{0in}-\lambda_{Sn}$ is suppressed in comparison to intensity of other wavelengths of the pump light generated by the pump light generator.

An aspect of the present invention is a distributed optical amplification method including: generating pump light for optically exciting an optical transmission line; and multiplexing n kinds (n is a positive integer) of light to be amplified and the pump light output, and outputting the multiplexed light to the optical transmission line, wherein, when a center wavelength of the n kinds of light to be amplified is denoted as $\lambda_{S1}$ to $\lambda_{Sn}$ and a zero-dispersion wavelength of the optical transmission line is denoted as $\lambda_0$, intensity of the pump light generated at n kinds of wavelengths ranging from $2\times\lambda_0-\lambda_{S1}$ to $2\times\lambda_0-\lambda_{Sn}$ is suppressed in comparison to intensity of other wavelengths of the pump light generated.

Advantageous Effects of Invention

According to the present invention, it is possible to provide a technology that can suppress quality degradation of transmitted signals associated with the distributed optical amplifier.

DESCRIPTION OF EMBODIMENTS

An embodiment of the present invention will be described in detail with reference to the diagrams.

In the present embodiment, a plurality of Configuration Examples of a distributed optical amplifier system will be described, prior to that, content common to the respective Configuration Examples will be described.

Figure 12:
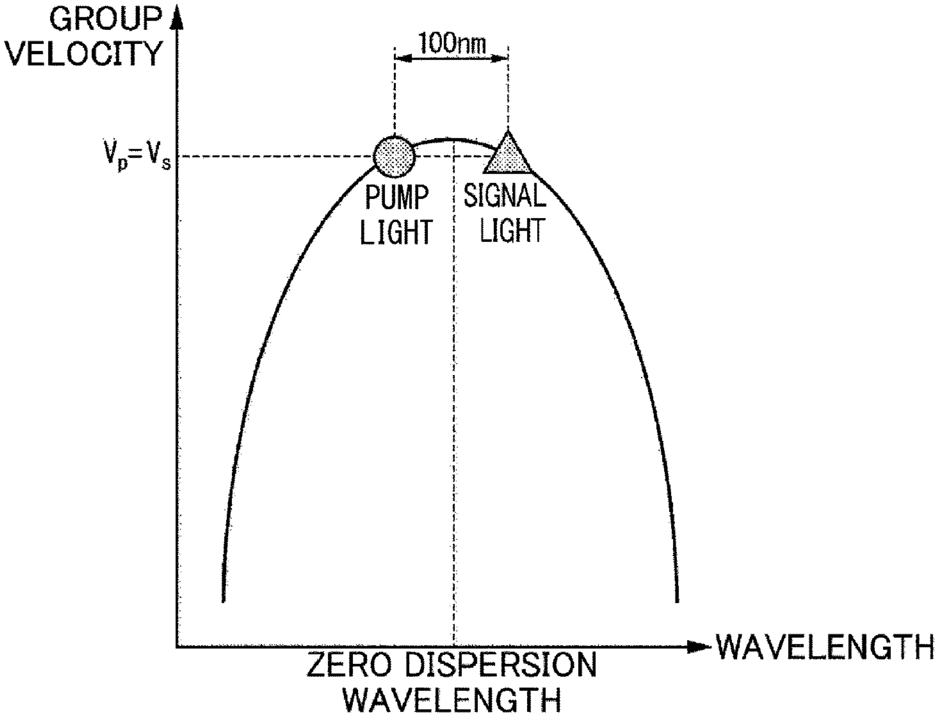
FIG. 12 is a diagram schematically showing a group velocity.

In the distributed optical amplifier system of this embodiment, an amplification action by Raman amplification is generated in the optical transmission line. In many cases, the group velocity of the optical transmission line is symmetrical with respect to the zero-dispersion wavelength. If $v_p$ and $v_s$ have values close to each other as shown in the graph of FIG. 12, then the pump light and the signal light propagate in the optical transmission line at the same speed. This occurs in the wavelength arrangement of $\lambda_S-\lambda_0=\lambda_0-\lambda_p$, where $\lambda_S$ is wavelength of the signal light, $\lambda_0$ is the zero-dispersion wavelength of the optical transmission line and $\lambda_p$ is the wavelength of the pump light.

$\lambda_S-\lambda_0=\lambda_0-\lambda_p$ can be rewritten as $\lambda_p=2\times\lambda_0-\lambda_S$ . . . (1). Therefore, the pump light that satisfies equation (1) should be prohibited, or if the optical spectrum of the pump light is wide, the wavelength range including the wavelength λp that satisfies equation (1) should be cut off with a filter.

Next, the range of the wavelength region to be cut off will be described. The problem of how much the wavelength region should be cut off comes down to a problem of how much the group velocity $v_s$ of the signal light and the group velocity $v_p$ of the pump light should differ to suppress the signal quality degradation due to the noise transfer from the pump light to the signal light to a negligible level.

However, the amount of noise in the pump light before being transmitted to the signal light largely depends on the design of the pump light source, and the penalty due to noise transfer to the signal light depends on a signal baud rate and a signal format. Therefore, it cannot be said unconditionally how much difference between $v_p$ and $v_s$ is acceptable as a transmission system.

Figure 13:
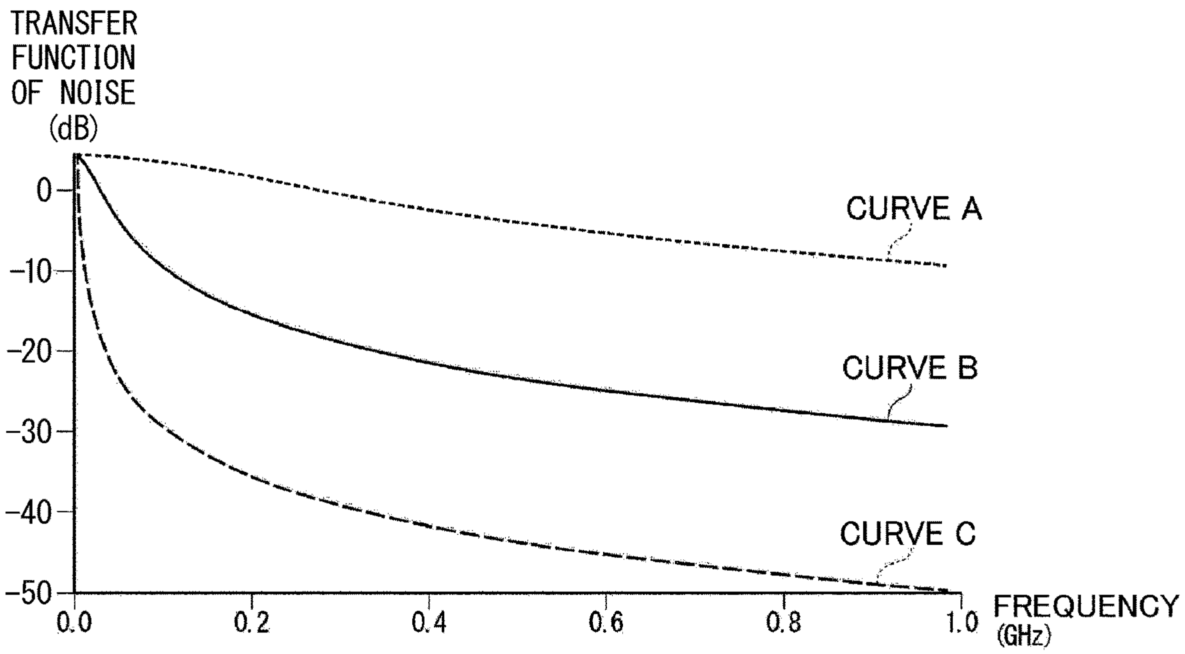
FIG. 13 is a graph showing a transfer function of noise from pump light to signal light.

Therefore, first, the results of calculation of how many noise components of the pump light are transferred to the signal light are shown to make an allowable measure. FIG. 13 is a graph showing a transfer function of noise from the pump light to the signal light. In this graph, a horizontal axis indicates a frequency (GHz), and a vertical axis indicates a transfer function of noise (dB). The transfer function shown in the graph is calculated on the basis of the model described in NPL 2 as to what percentage of the noise component of the pump light is transfer to the signal light at the frequency shown on the horizontal axis. The forward pumping with an on/off gain of 7 dB is assumed, and the length of an optical transmission line (gain medium) is assumed to be 80 km.

In the graph, three curves A, B and C are shown. Curve A shows the transfer function of a case of $|1-v_s/v_p|=0.00001$. Curve B shows the transfer function of a case of $|1-v_s/v_p|=0.0001$. Curve C shows the transfer function of a case of $|1-v_s/v_p|=0.001$.

As shown in these curves A, B, and C, if $|1-v_s/v_p|$ is greater than 0.0001, it is understood that the noise transfer is rapidly reduced. Therefore, $|1-v_s/v_p|>0.00001$ can be used as a standard of design.

Hereinafter, each Configuration Example will be described.

Configuration Example 1

Figure 1:
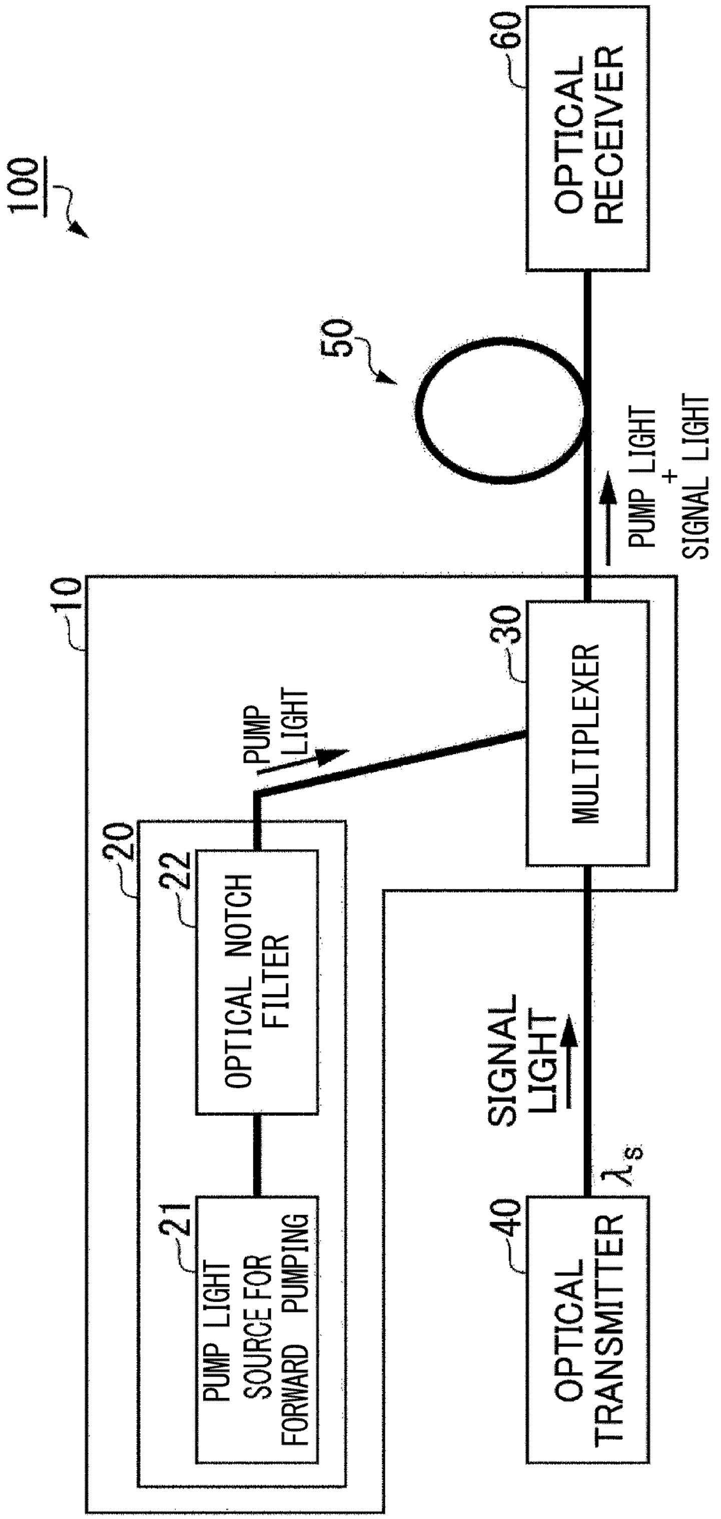
FIG. 1 is a block diagram showing a configuration of a distributed optical amplifier system in Configuration Example 1.

FIG. 1 is a block diagram showing a configuration of distributed optical amplifier system 100 in Configuration Example 1 of the embodiment. The distributed optical amplifier system 100 includes a distributed optical amplifier 10, an optical transmitter 40, an optical transmission line 50, and an optical receiver 60.

The optical transmitter 40 outputs signal light to the optical receiver 60. A carrier wavelength of this signal light is denoted as $\lambda_S$. The distributed optical amplifier 10 outputs the signal light from the optical transmitter 40 and pump light to the optical transmission line 50. The optical receiver 60 receives amplified signal light from the optical transmission line 50.

The distributed optical amplifier 10 is made up of a pump light generator 20 and a multiplexer 30. The pump light generator 20 generates pump light for optically exciting the optical transmission line. The pump light generator 20 is made up of a pump light source 21 for forward pumping and an optical notch filter 22. The pump light source 21 for forward pumping outputs the pump light having a wide spectrum width. This wide spectrum can be generated from white noise. As the pump light source 21 for forward pumping, a multi-mode laser which oscillates a large number of longitudinal modes in a wide wavelength region may be used as the pump light source.

In the pump light output from the pump light source 21 for forward pumping, a part of spectrum is cut off by an optical notch filter 22. The multiplexer 30 multiplexes the pump light output from the pump light generator 20 and outputs the result to the optical transmission line 50. That is, the optical output of the optical notch filter 22 is multiplexed with the signal light by the multiplexer 30 and is made incident on the optical transmission line 50.

Figure 2:
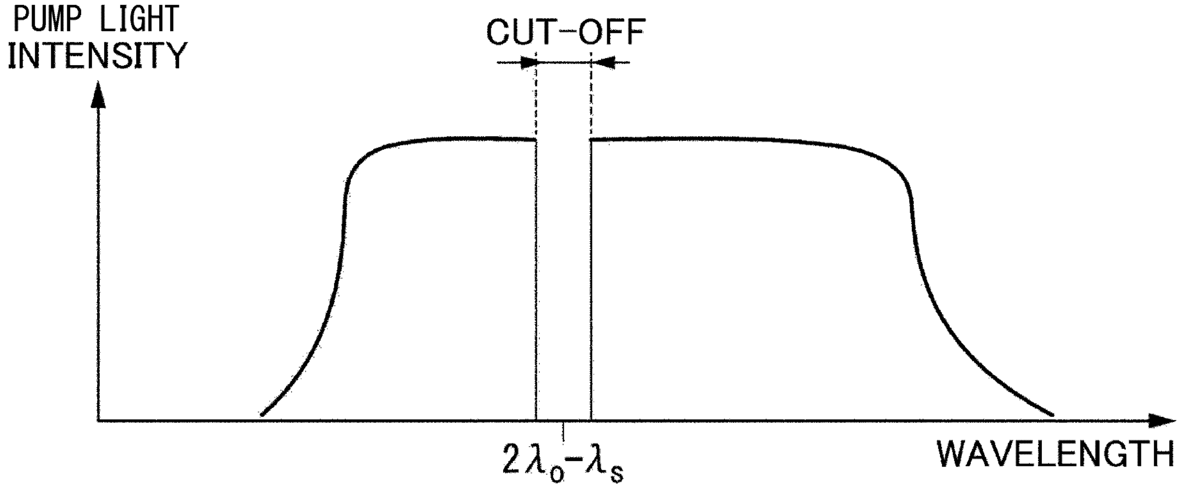
FIG. 2 is a diagram schematically showing an optical spectrum of partially cut off pump light.

FIG. 2 is a diagram schematically showing the optical spectrum of the pump light partially cut off by the optical notch filter 22. In the graph shown in FIG. 2, a horizontal axis indicates the wavelength, and a vertical axis indicates the pump light intensity. $\lambda_0$ indicates the zero-dispersion wavelength of the optical transmission line 50 as described above. $\lambda_S$ represents the wavelength of the signal light as described above.

The optical notch filter 22 cuts off light of a wavelength in a wavelength region including $2\times\lambda_0-\lambda_S$. That is, the intensity of the pump light having a wavelength of $2\times\lambda_0-\lambda_S$ among the pump light generated by the pump light generator 20 is suppressed in comparison with the intensity of the other wavelengths of the pump light generated by the pump light generator 20. Thus, since the worst condition that $v_p$ and $v_s$ coincide with each other can be avoided, the quality degradation of the transmitted signal can be suppressed. Since the gain band of the Raman amplification is wide, the Raman amplification can be performed even if a part of the pump light is cut off. Here, as described above, the wavelength region to be cut off is desirably set to a value that satisfies $|1-v_s/v_p|>0.00001$.

Configuration Example 2

Figure 3:
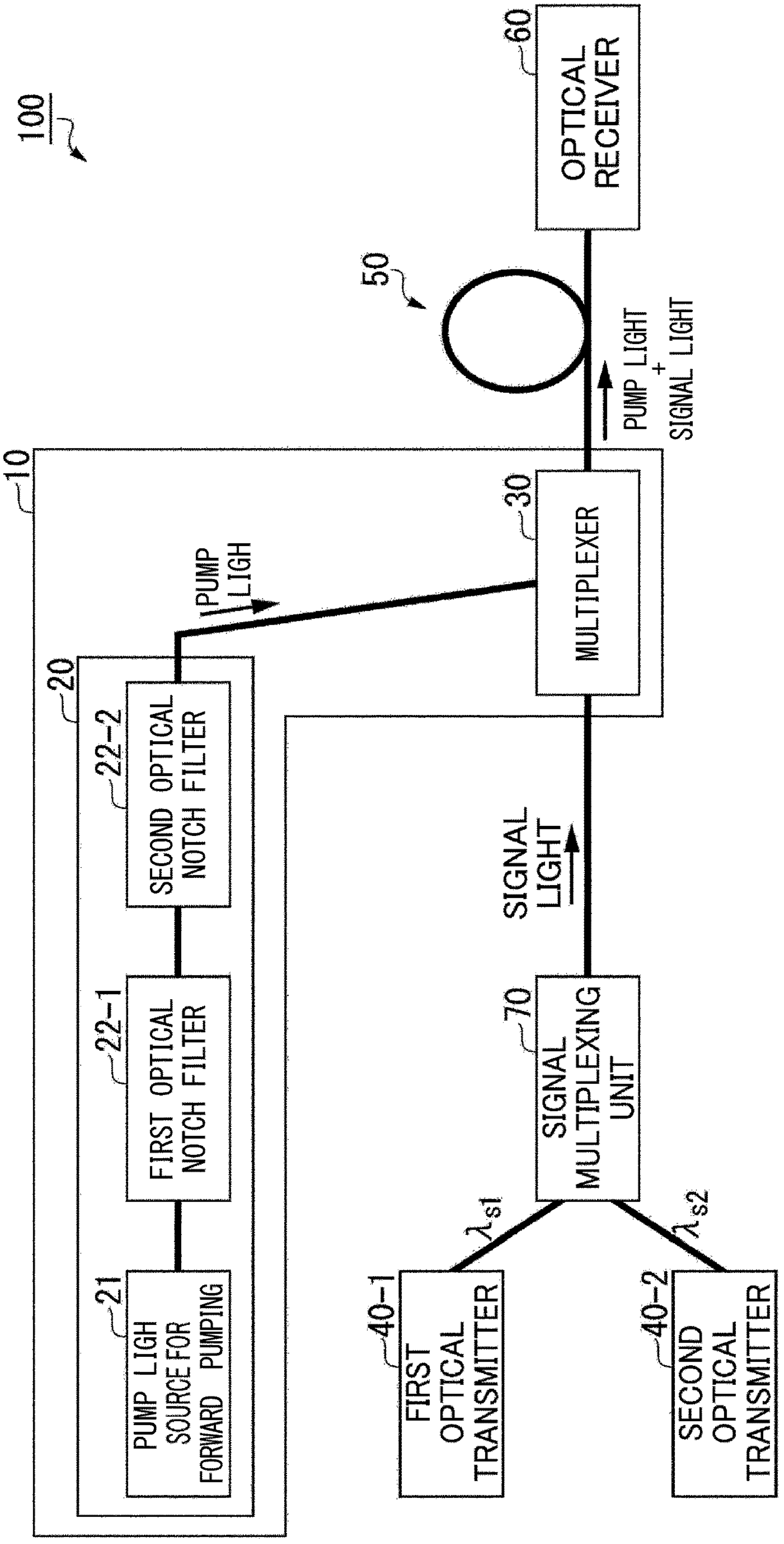
FIG. 3 is a block diagram showing the configuration of a distributed optical amplifier system in Configuration Example 2.

FIG. 3 is a block diagram showing the configuration of the distributed optical amplifier system 100 in Configuration Example 2 in the embodiment. A distributed optical amplifier system 100 includes a distributed optical amplifier 10, a first optical transmitter 40-1, a second optical transmitter 40-2, a signal light multiplexer 70, an optical transmission line 50, and an optical receiver 60.

The first optical transmitter 40-1 outputs signal light. The carrier wavelength of an optical signal is denoted as $\lambda_{S1}$. The second optical transmitter 40-2 outputs signal light. A carrier wavelength of this signal light is denoted as $\lambda_{S2}$. The signal light multiplexer 70 multiplexes the signal light output from the first optical transmitter 40-1 and the signal light output from the second optical transmitter 40-2. The distributed optical amplifier 10 outputs the signal light from the signal light multiplexer 70 and pump light to the optical transmission line 50. The optical receiver 60 receives amplified signal light from the optical transmission line 50.

The distributed optical amplifier 10 is made up of an pump light generator 20 and a multiplexer 30. The pump light generator 20 generates pump light for optically exciting the optical transmission line. The pump light generator 20 is made up of an pump light source 21 for forward pumping, a first optical notch filter 22-1, and a second optical notch filter 22-2. The pump light source 21 for forward pumping outputs pump light having a wide spectrum width. As described above, this wide spectrum can be generated from white noise. As the pump light source 21 for forward pumping, a multi-mode laser which oscillates a large number of longitudinal modes in a wide wavelength region may be used as the pump light source.

In the pump light output from the pump light source 21 for forward pumping, a part of spectrum is cut off by the first optical notch filter 22-1 and the second optical notch filter 22-2. The multiplexer 30 multiplexes the light to be amplified and the pump light output from the pump light generator 20, and outputs it to the optical transmission line 50. That is, the optical output of the optical notch filter 22 is multiplexed with the signal light by the multiplexer 30, and is made incident on the optical transmission line 50.

As described above, the difference between Configuration Example 1 and Configuration Example 2 is that two optical transmitters of the first optical transmitter 40-1 and the second optical transmitter 40-2 are used, signal lights with different wavelengths output from these optical transmitters are multiplexed by the signal light multiplexer 70 and then multiplexed with the pump light by the distributed optical amplifier 10.

Further, the difference between the Configuration Example 1 and the Configuration Example 2 is that two filters of the first optical notch filter 22-1 and the second optical notch filter 22-2 are provided. The first optical notch filter 22-1 cuts off light of a wavelength in a wavelength region including $2\times\lambda_0-\lambda_{S1}$. The second optical notch filter 22-2 cuts off light of a wavelength in a wavelength region including $2\times\lambda_0-\lambda_{S2}$. $\lambda_0$ represents the zero-dispersion wavelength of the optical transmission line 50 as described above. $\lambda_S$ represents the wavelength of the signal light as described above.

Figure 4:
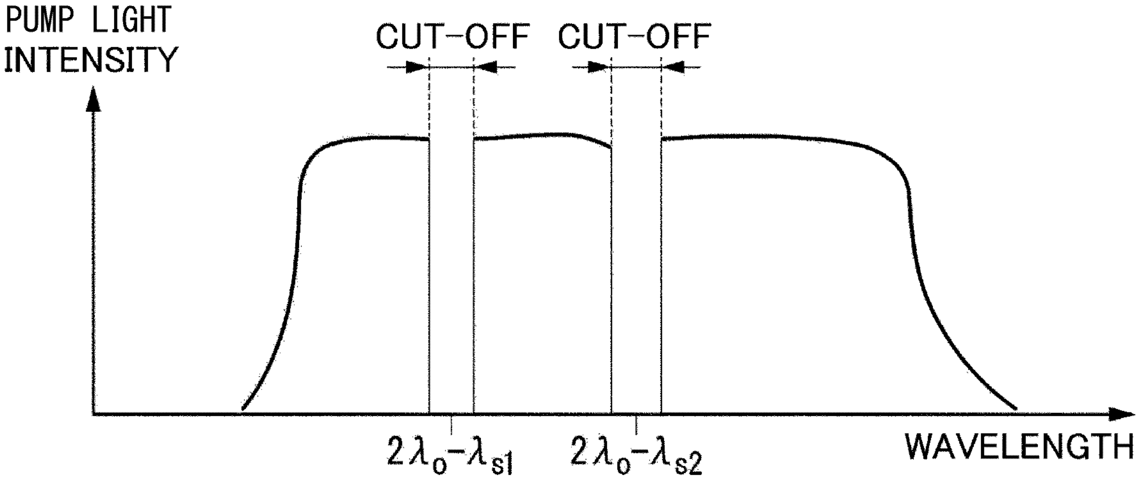
FIG. 4 is a diagram schematically showing an optical spectrum of partially cut off pump light.

FIG. 4 is a diagram schematically showing the optical spectrum of the pump light that is partially cut off by the first band optical notch filter 22-1 and the second optical notch filter 22-2. In the graph shown in FIG. 4, a horizontal axis indicates the wavelength, and a vertical axis indicates the intensity of the pump light.

FIG. 4 shows that the light of the wavelength region including $2\times\lambda_0-\lambda_{S1}$ and the light of the wavelength region including $2\times\lambda_0-\lambda_{S2}$ are cut off. Intensity of the pump light generated by the pump light generator 20 at two kinds of wavelengths from $2\times\lambda_0-\lambda_{S1}$ to $2\times\lambda_0-\lambda_{S2}$ is suppressed in comparison with intensity of the other wavelengths of the pump light generated by the pump light generator 20. Thus, since the worst condition that the group velocity of the signal light output from the first optical transmitter 40-1 and the second optical transmitter 40-2 coincides with the group velocity of the pump light can be avoided, the quality degradation of the transmitted signal can be suppressed.

As described above, the pump light generator 20 in Configuration Example 2 is made up of the pump light source 21 for forward pumping and two optical notch filters (a first optical notch filter 22-1, and a second optical notch filter 22-2), and the light output from the pump light source 21 for forward pumping includes two kinds of cut-off light bands ranging from $2\times\lambda_0-\lambda_{S1}$ to $2\times\lambda_0-\lambda_{S2}$, and the two optical notch filters cut off light of two kinds of wavelengths ranging from $2\times\lambda_0-\lambda_{S1}$ to $2\times\lambda_0-\lambda_{S2}$ among light output from the pump light source 21 for forward pumping.

That is, Configuration Example 2 is a configuration example of "the pump light generator includes a light source, and n or less optical notch filter. The spectrum of the light output from the light source includes one or more of n kinds of wavelengths represented by $2\times\lambda_0-\lambda_{S1}$ to $2\times\lambda_0-\lambda_{Sn}$. And the optical notch filters of the number equal to or less than n cut off all wavelengths corresponding to n kinds of wavelengths represented by $2\times\lambda_0-\lambda_{S1}$ to $2\times\lambda_0-\lambda_{Sn}$ from the spectrum of the light output from the light source", where n=2 and the number of optical notch filters is two.

Modified Example of Configuration Example 2

In Configuration Example 2, a configuration using two optical transmitters was described. However, the number of optical transmitters in an actual wavelength multiplex transmission system is much more than 2, and many signal lights from these optical transmitters are often transmitted in a dense wavelength arrangement. Therefore, a configuration that uses n (n is a positive integer) optical transmitters will be described as a modified example of Configuration Example 2.

Figure 5:
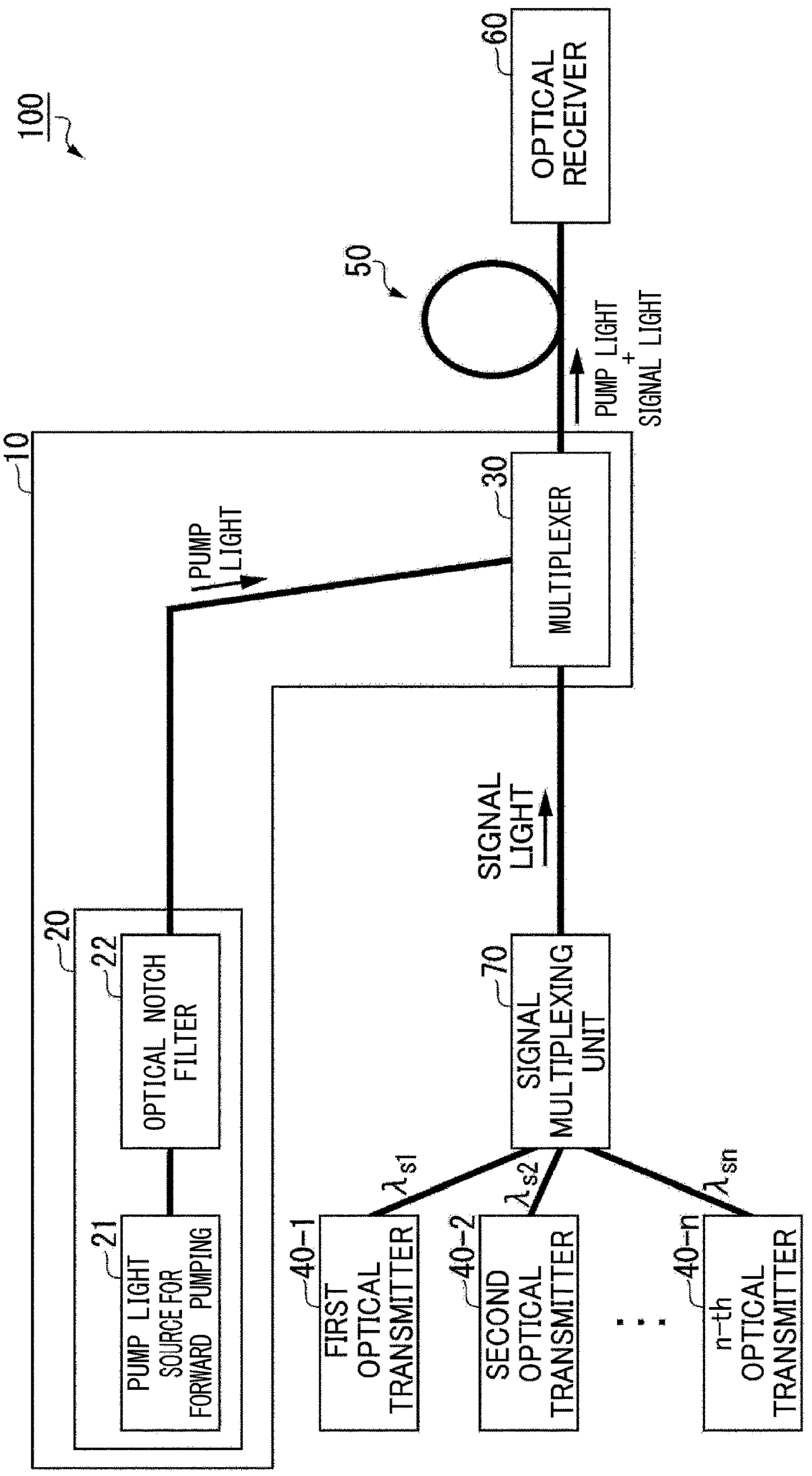
FIG. 5 is a block diagram showing the configuration of a distributed optical amplifier system in Configuration Example 2 (modified example).

FIG. 5 is a block diagram showing a configuration of a distributed optical amplifier system 100 according to a second embodiment. The distributed optical amplifier system 100 includes a distributed optical amplifier 10, a first optical transmitter 40-1, a second optical transmitter 40-2, . . . , an n-th optical transmitter **40-*n*, a signal light multiplexer 70, an optical transmission line 50, and an optical receiver 60**.

A k-th optical transmitter **40-*k* (k=1 to n) outputs signal light. The carrier wavelength of an optical signal is denoted as $\lambda_{Sk}$. A signal light multiplexer 70 multiplexes the signal light output from the first optical transmitter 40-1, the signal light output from the second optical transmitter 40-2, . . . , and the signal light output from the n-th optical transmitter 40-*n*. The distributed optical amplifier 10 outputs the signal light from the signal light multiplexer 70 and pump light to the optical transmission line 50. The optical receiver 60 receives amplified signal light from the optical transmission line 50**.

The distributed optical amplifier 10 is made up of a pump light generator 20 and a multiplexer 30. The pump light generator 20 generates pump light for optically exciting the optical transmission line. The pump light generator 20 is made up of a pump light source 21 for forward pumping and an optical notch filter 22. That is, the pump light generator 20 is made up of an pump light source 21 for forward pumping and optical notch filter 22 of number (one) smaller than n. The pump light source 21 for forward pumping outputs pump light having a wide spectrum width. As described above, this wide spectrum can be generated from white noise. As the pump light source 21 for forward pumping, a multi-mode laser which oscillates a large number of longitudinal modes in a wide wavelength region may be used as the pump light source.

In the pump light output from the pump light source 21 for forward pumping, a part of spectrum is cut off by the optical notch filter 22. The optical output of the optical notch filter 22 is multiplexed with the signal light by the multiplexer 30 and made incident on the optical transmission line 50. In the modified example, the pump light generator 20 is made up of a pump light source 21 for forward pumping, and an optical notch filter 22 of number (one) smaller than n.

Thus, the distributed optical amplifier system 100 includes the distributed optical amplifier 10 which amplifies n kinds of light to be amplified in the optical transmission line. The multiplexer 30 multiplexes the n kinds of light to be amplified and the pump light output from the pump light generator 20 and outputs the multiplexed light to the optical transmission line.

Although the optical notch filter corresponding to each optical transmitter was provided in Configuration Example 2, one optical notch filter 22 is provided in the modified example. Although the optical notch filter may be provided for every $2\times\lambda_0-\lambda_{Sk}$ (k=1 to n) as in Configuration Example 2, an optical notch filter 22 for cutting off light of a wavelength in a single wavelength region including any of $2\times\lambda_0-\lambda_{Sk}$ (k=1 to n) is used in the modified example.

Figure 6:
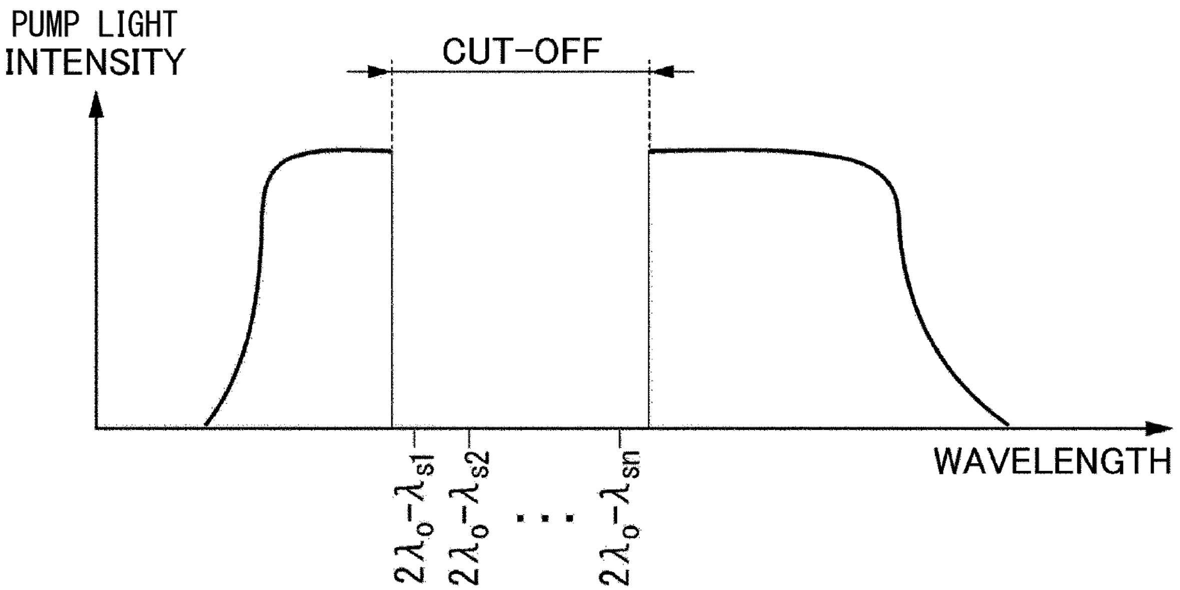
FIG. 6 is a diagram schematically showing an optical spectrum of partially cut off pump light.

FIG. 6 is a diagram schematically showing an optical spectrum of pump light obtained by collectively cutting off light having a wavelength of $2\times\lambda_0-\lambda_{Sk}$ (k=1 to n) by the optical notch filter 22. In the graph shown in FIG. 6, the horizontal axis indicates the wavelength, and the vertical axis indicates the intensity of the pump light. FIG. 6 shows that lights of wavelengths of $2\times\lambda_0-\lambda_{Sk}$ (k=1 to n) are collectively cut off. That is, the intensity in n kinds of wavelengths ranging from $2\times\lambda_0-\lambda_{S1}$ to $2\times\lambda_0-\lambda_{Sn}$ is suppressed in comparison with the intensity of the other wavelengths of the pump light generated by the pump light generator 20. Thus, since it is possible to avoid the worst condition that the group velocity of the signal light output from the k-th optical transmitter 40-*k* (k=1 to n) coincides with the group velocity of the pump light, the quality degradation of the transmitted signal can be suppressed.

Attention should be paid to the configuration in which the light is cut off collectively in that the wavelength region to be cut off is not always located at the center of the optical spectrum of the pump light. In the case of an optical fiber, although the Raman gain becomes the highest at $\lambda_S-\lambda_p=100$ nm, since this relational expression is not directly related to $\lambda_0$, in order to obtain the maximum Raman gain, a configuration in which the region of the cut-off wavelength in FIG. 6 is closer to the longer wavelength side or the shorter wavelength side of the optical spectrum of the pump light may be used.

Further, as a result of selecting the wavelength arrangement for obtaining the maximum Raman gain, the pump light may not exist on the longer wavelength side than $2\times\lambda_0-\lambda_{Sm}$ or on the shorter wavelength side than $2\times\lambda_0-\lambda_{Sm}$ with m being a positive integer equal to or less than n. In such a case, it is also possible to narrow the cut-off region of the optical notch filter, for example, so that the cutoff region should not include wavelengths where no pump light is present.

The pump light generator 20 may be constituted by an optical notch filter of number smaller than n (n≥3). For example, two filters are provided, and one optical notch filter cuts off r kinds of wavelengths of k=1 to r, in $2\times\lambda_0-\lambda_{Sk}$ (k=1 to n). The other optical notch filter cuts off n−r kinds of wavelengths of k=r+1 to n, in $2\times\lambda_0-\lambda_{Sk}$ (k=1 to n). In this way, at least one of the band optical notch filter may be configured to simultaneously cut off two or more among n kinds of wavelengths ranging from $2\times\lambda_0-\lambda_{S1}$ to $2\times\lambda_0-\lambda_{Sn}$.

Configuration Example 3

Figure 7:
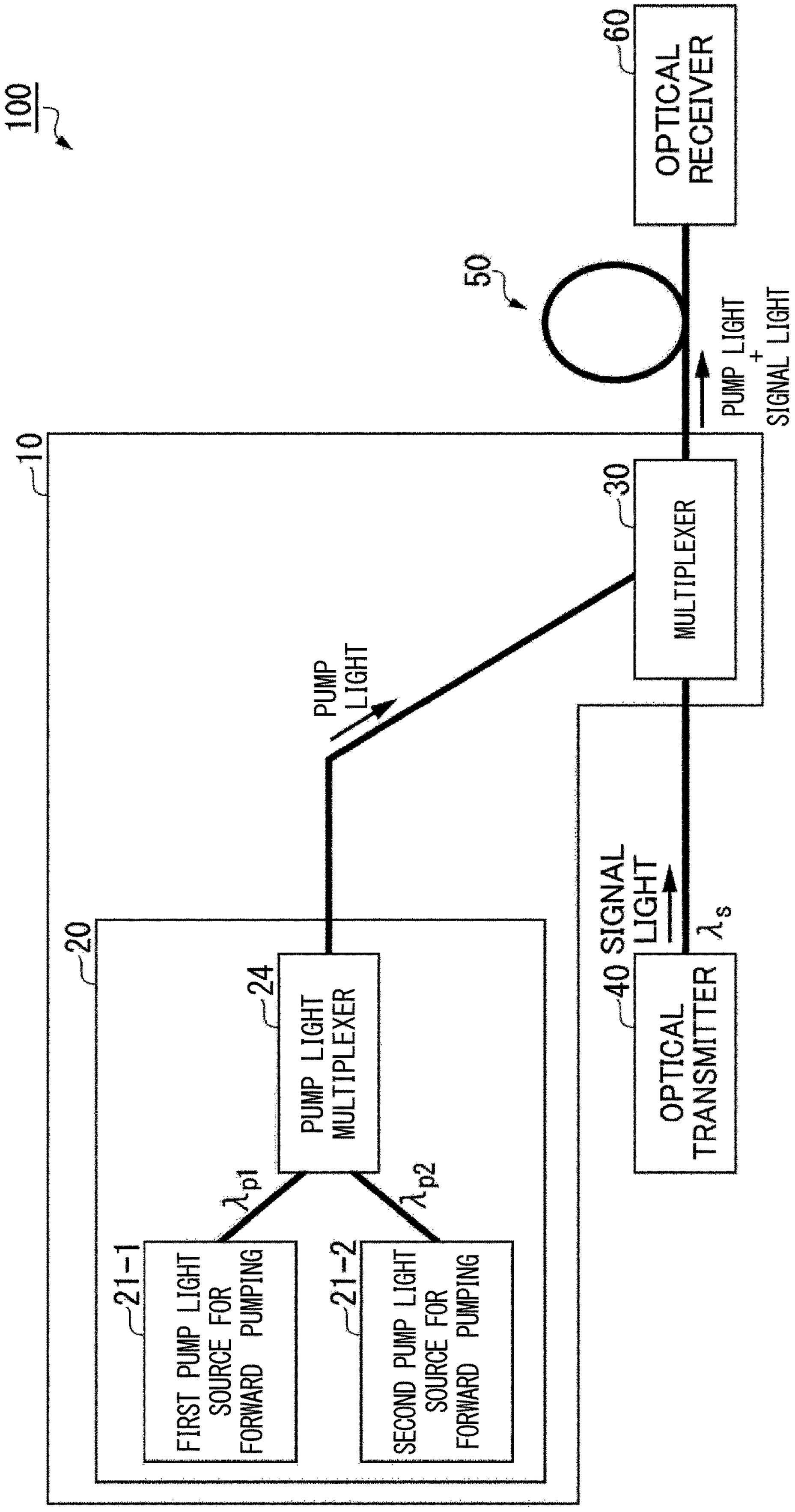
FIG. 7 is a block diagram showing the configuration of a distributed optical amplifier system in Configuration Example 3.

FIG. 7 is a block diagram showing a configuration of a distributed optical amplifier system 100 according to a third embodiment. All of the above-described Configuration Examples 1, 2 and modified example of Configuration Example 2 were configured to use the optical notch filter. On the other hand, in Configuration Example 3, pump light having different center wavelengths output from a plurality of pump light sources for forward pumping is multiplexed without using an optical notch filter. Normally, a high-power pump light is required for Raman amplification, since it is difficult to generate it with a single pump light source, so a configuration that multiplex the pump light having slightly different wavelengths is widely used.

As shown in FIG. 7, the distributed optical amplifier system 100 includes a distributed optical amplifier 10, an optical transmitter 40, an optical transmission line 50, and an optical receiver 60.

The optical transmitter 40 transmits signal light. The carrier wavelength of the optical signal is denoted as $\lambda_S$. The distributed optical amplifier 10 outputs the signal light from the optical transmitter 40 and pump light to the optical transmission line 50. The optical receiver 60 receives amplified signal light from the optical transmission line 50.

The distributed optical amplifier 10 is made up of an pump light generator 20 and a multiplexer 30. The pump light generator 20 is made up of a first pump light source 21-1 for forward pumping, a pump light source 21-2 for forward pumping, and a pump light multiplexer 24.

The first pump light source 21-1 for forward pumping outputs pump light to the pump light multiplexer 24. The center wavelength of the pump light is denoted as $\lambda_{p1}$. The second pump light source 21-2 for forward pumping outputs pump light to the pump light multiplexer 24. The center wavelength of the pump light is denoted as $\lambda_{p2}$. In Configuration Example 3 as well, $\lambda_{p1}$ and $\lambda_{p2}$ are selected to satisfy $\lambda_{p2}<2\times\lambda_0-\lambda_S<\lambda_{p1}$ to prevent light having a wavelength in the wavelength region including $2\times\lambda_0-\lambda_S$ from being multiplexed. Here, $\lambda_0$ represents the zero-dispersion wavelength of the optical transmission line 50 as described above. $\lambda_S$ represents the wavelength of the signal light as described above.

The pump light multiplexer 24 multiplexes the pump light output from the first pump light source 21-1 for forward pumping and the pump light output from the second pump light source 21-2 for forward pumping, and outputs them to the multiplexer 30. The multiplexer 30 multiplexes the pump light and the signal light output from the pump light multiplexer 24, and outputs them to the optical transmission line 50.

Figure 8:
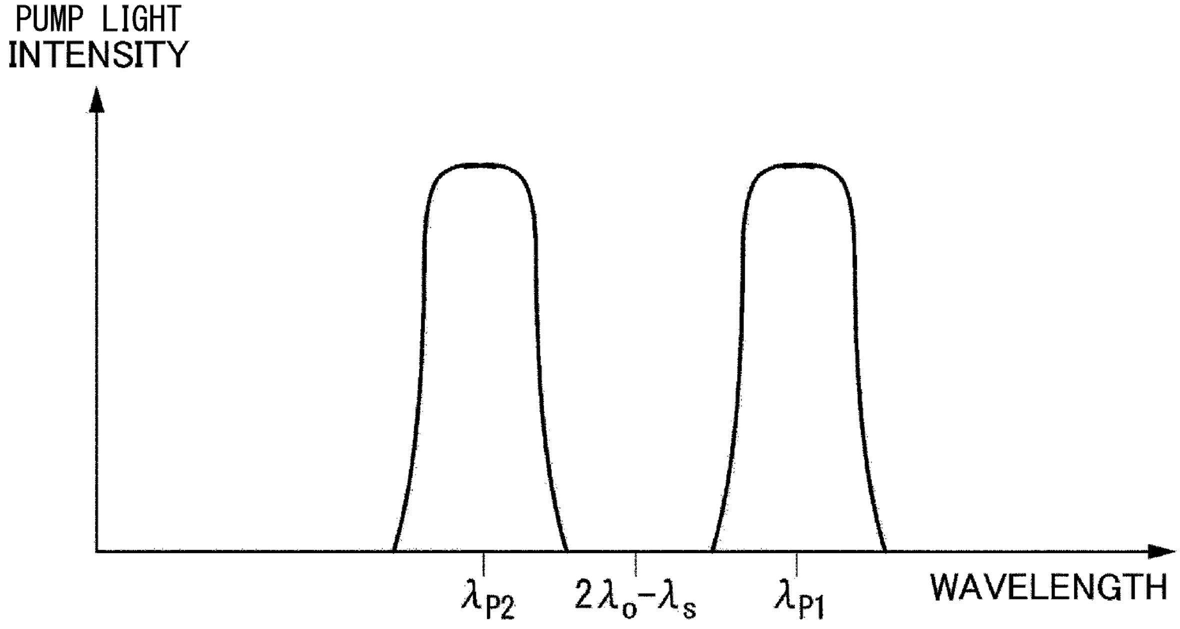
FIG. 8 is a diagram schematically showing an optical spectrum of pump light.

FIG. 8 is a diagram schematically showing the optical spectrum of pump light. In the graph shown in FIG. 8, the horizontal axis indicates the wavelength, and the vertical axis indicates the intensity of the pump light. As shown in FIG. 8, there is no pump light having a wavelength in a wavelength region including $2\times\lambda_0-\lambda_S$, as in the above-described Configuration Example. Therefore, the same effect as that of the above-described Configuration Example can be achieved without using an optical notch filter. Thus, since it is possible to avoid the worst condition that the group velocity of the signal light and the group velocity of the pump light coincide with each other, the quality degradation of the transmitted signal can be suppressed. In Configuration Example 3, two pump light sources for forward pumping are used, but pump light sources for forward pumping of a larger number of wavelengths may be used.

As described above, in Configuration Example 3, the pump light generator 20 is made up of a plurality of light sources (the first pump light source 21-1 for forward pumping and the second pump light source 21-2 for forward pumping), and the light output from the plurality of light sources does not include light of one kind of wavelength of $2\times\lambda_0-\lambda_S$. Further, as shown in FIG. 8, the longest wavelength and the shortest wavelength among the wavelengths of the light output from the plurality of light sources are outside the range including one kind of wavelength of $2\times\lambda_0-\lambda_S$.

Configuration Example 4

Figure 9:
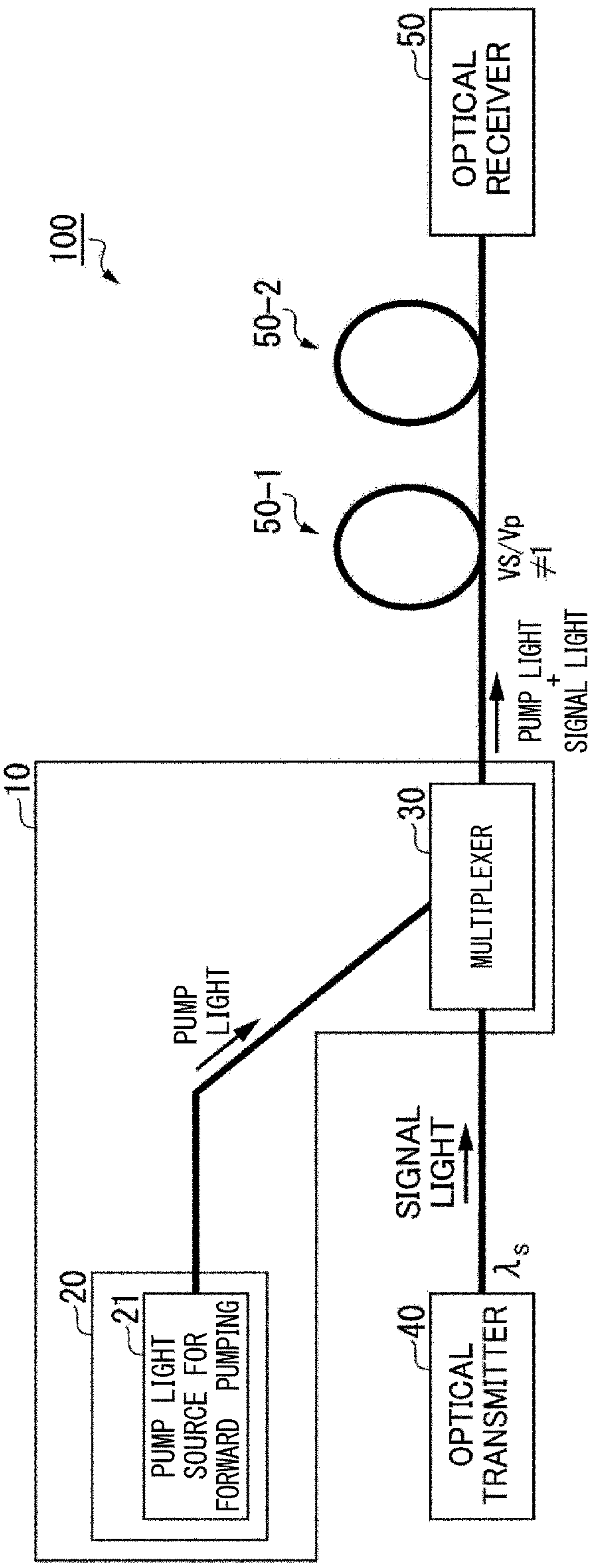
FIG. 9 is a diagram showing the configuration of a distributed optical amplifier system in Configuration Example 4.
Figure 10:
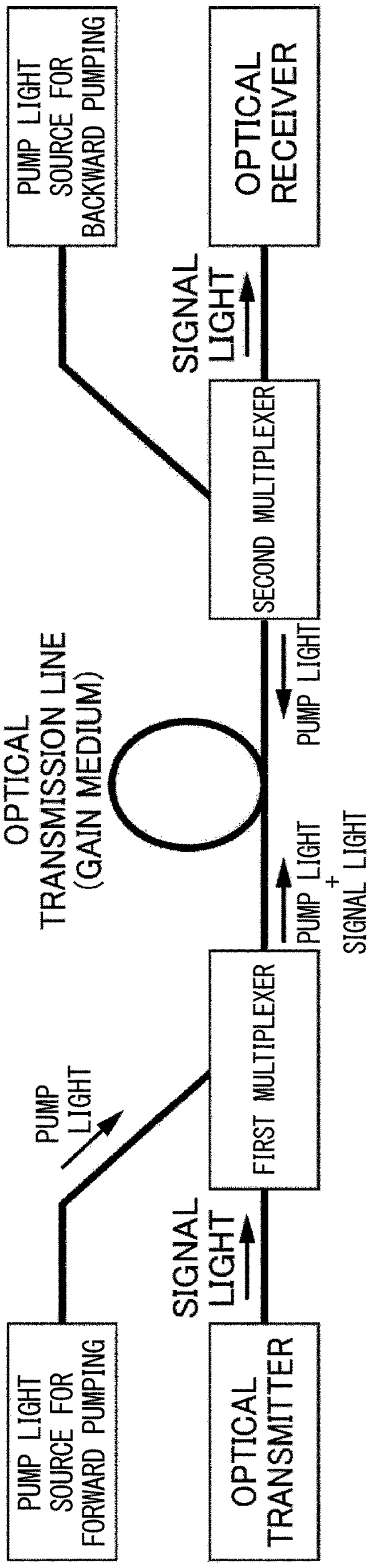
FIG. 10 shows the configuration of an optical transmission system using distributed Raman amplification.
Figure 11:
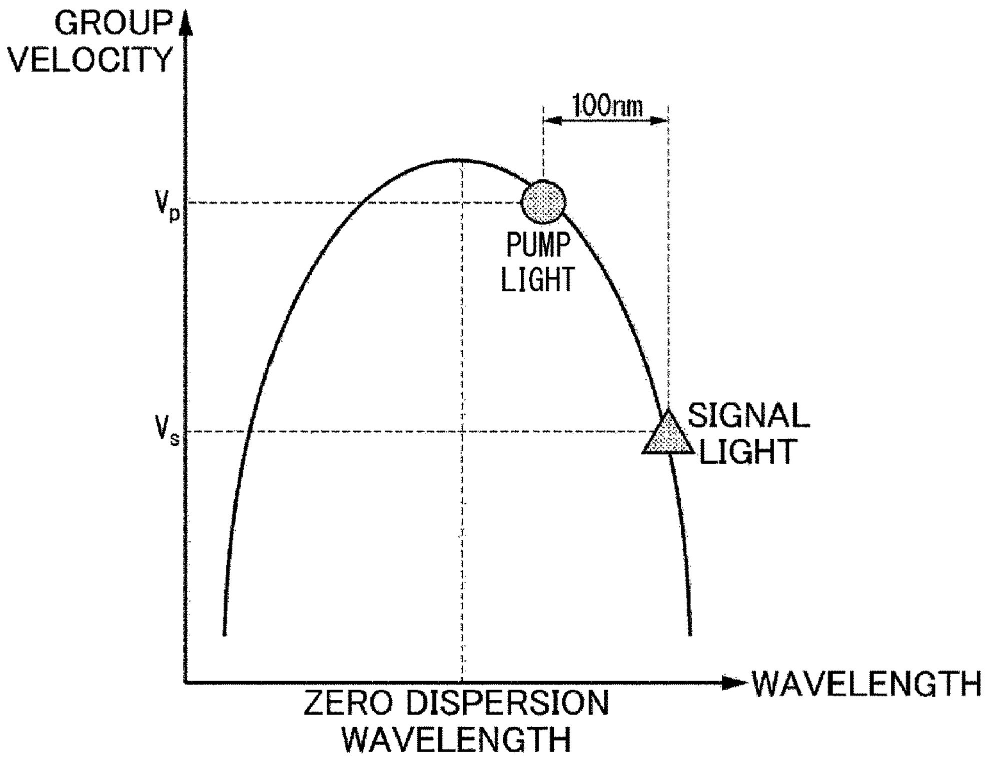
FIG. 11 is a diagram schematically showing a group velocity.

FIG. 9 is a block diagram showing the configuration of the distributed optical amplifier system 100 in Configuration Example 4. Configuration Example 4 is configured so that two optical transmission lines having different zero-dispersion wavelengths are arranged in columns.

As shown in FIG. 9, the distributed optical amplifier system 100 includes a distributed optical amplifier 10, an optical transmitter 40, a first optical waveguide 50-1, a second optical waveguide 50-2, and an optical receiver 60.

The optical transmitter 40 outputs signal light. The distributed optical amplifier 10 outputs the signal light from the optical transmitter 40 and pump light to the first optical waveguide 50-1. A second optical waveguide 50-2 is connected to a rear stage of the first optical waveguide 50-1, and the second optical waveguide 50-2 is connected to the optical receiver 60. In this way, the optical transmission line is constituted by connecting a plurality of optical waveguides in columns.

The optical receiver 60 receives the signal light from the second optical waveguide 50-2. The distributed optical amplifier 10 is made up of a pump generator 20 and a multiplexer 30. The pump light generator 20 is made up of a pump light source 21 for forward pumping.

Since the first optical waveguide 50-1 is closer to the multiplexer 30 than the second optical waveguide 50-2, pump light having intensity higher than that of the second optical waveguide 50-2 propagates. In Configuration Example 4, wavelength dispersion is selected so that $v_p$ and $v_s$ have sufficiently different values in the first optical waveguide 50-1. In order to satisfy this condition, when the zero-dispersion wavelength in the first optical waveguide 50-1 is denoted as $\lambda_{0in}$, the pump light may be set so as not to have a wavelength component of $2\times\lambda_{0in}-\lambda_S$. More generally, when the center wavelength of the light to be amplified is $\lambda_{S1}$ to $\lambda_{Sn}$, the pump light may not include n kinds of wavelengths ranging from $2\times\lambda_{0in}-\lambda_{S1}$ to $2\times\lambda_{0in}-\lambda_{Sn}$.

Since the intensity of the pump light is attenuated in the process of propagating through the transmission line and the Raman gain viewed locally is also reduced, even if $v_p$ and $v_s$ in the second optical waveguide 50-2 have close values, since the noise transfer from the pump light to the signal light can be suppressed, the quality degradation of the transmitted signal can be suppressed.

In each of the above-described embodiments, the configuration in which the pump light amplifies the signal light has been described. However, in a system for performing high-order Raman amplification, a multi-stage configuration may be adopted in which the first pump light amplifies the second pump light and the second pump light amplifies the signal light, using the first pump light and the second pump light whose wavelengths are separated by 100 nm. In such a configuration, the same configuration as in each embodiment can be used, after the group velocity of the second pump light is replaced by $v_s$ and the wavelength of the second pump light is replaced by $\lambda_S$. At this time, all of the first pump light, the second pump light, and the signal light may be propagated in the same direction, or only one of the three kinds may be propagated in the opposite direction to the other two, using the backward pumping.

In each embodiment, the optical amplification using Raman amplification has been described. However, as long as the distributed optical amplifier amplifies light of another wavelength by the pump light in the optical transmission line, it is not limited to Raman amplification, but another nonlinear optical effect may be used.

Although the embodiment of the present invention has been described in detail with reference to the drawings, a specific configuration is not limited to this embodiment, and design within the scope of the gist of the present invention, and the like are included.

INDUSTRIAL APPLICABILITY

The present invention is applicable to a distributed optical amplifier system that performs transmission through an optical fiber transmission line.

REFERENCE SIGNS LIST

10 Distributed optical amplifier
20 Pump light generator
21 Pump light source for forward pumping
21-1 First pump light source for forward pumping
21-2 Second pump light source for forward pumping
22 Optical notch filter
24 Pump light multiplexer
30 Multiplexer
40 Optical transmitter
40-1 First optical transmitter
40-2 Second optical transmitter
**40-*n*** Optical transmitter
50 Optical transmission line
50-1 First optical waveguide
50-2 Second optical waveguide
60 Optical receiver
70 Signal light multiplexer
100 Distributed optical amplifier system

The invention claimed is:

1. A distributed optical amplifier comprising:

a pump light generator which generates pump light for optically exciting an optical transmission line; and a multiplexer which multiplexes n kinds (n is a positive integer) of light to be amplified and the pump light output from the pump light generator, and outputs the multiplexed light to the optical transmission line, wherein, when a center wavelength of the n kinds of light to be amplified is denoted as $\lambda_{S1}$ to $\lambda_{Sn}$ and a zero-dispersion wavelength of the optical transmission line is denoted as $\lambda_0$, intensity of the pump light generated by the pump light generator is suppressed at n kinds of wavelengths represented by $2\times\lambda_0-\lambda_{S1}$ to $2\times\lambda_0-\lambda_{Sn}$ in comparison to intensity of other wavelengths of the pump light generated by the pump light generator.

2. The distributed optical amplifier according to claim 1, wherein the pump light generator comprises a light source, and n or fewer optical notch filter, the spectrum of the light output from the light source comprises one or more of n kinds of wavelengths ranging from $2\times\lambda_0-\lambda_{S1}$ to $2\times\lambda_0-\lambda_{Sn}$, and the n or fewer optical notch filters cut off all wavelengths corresponding to n kinds of wavelengths represented by $2\times\lambda_0-\lambda_{S1}$ to $2\times\lambda_0-\lambda_{Sn}$ from the spectrum of the light output from the light source.

3. The distributed optical amplifier according to claim 1, wherein the pump light generator comprises a plurality of light sources, the light output from the plurality of light sources does not include light of n kinds of wavelengths ranging from $2\times\lambda_0-\lambda_{S1}$ to $2\times\lambda_0-\lambda_{Sn}$, and the longest wavelength and the shortest wavelength of the light output from the plurality of light sources are located outside a range that includes all n kinds of wavelengths ranging from $2\times\lambda_0-\lambda_{S1}$ to $2\times\lambda_0-\lambda_{Sn}$.

4. The distributed optical amplifier according to claim 1, wherein, when a group velocity in the optical transmission line of any one of the n kinds of lights to be amplified is denoted as $v_s$, and a group velocity in the optical transmission line of light of any wavelength included in the pump light output from the pump light generator is denoted as $v_p$, $|1-v_s/v_p|>0.0001$ is satisfied.

5. The distributed optical amplifier according to claim 1, wherein the n kinds of light to be amplified are used as pump light for amplifying light of another wavelength.

6. The distributed optical amplifier according to claim 2, wherein the n kinds of light to be amplified are used as pump light for amplifying light of another wavelength.

7. The distributed optical amplifier according to claim 3, wherein the n kinds of light to be amplified are used as pump light for amplifying light of another wavelength.

8. The distributed optical amplifier according to claim 4, wherein the n kinds of light to be amplified are used as pump light for amplifying light of another wavelength.

9. A distributed optical amplifier system comprising an optical transmitter which transmits n kinds (n is a positive integer) of signal light, a distributed optical amplifier which amplifies the signal light transmitted by the optical transmitter in an optical transmission line as light to be amplified, and an optical receiver which receives the signal light amplified by the distributed optical amplifier, wherein the distributed optical amplifier comprises a pump light generator which generates pump light for optically exciting the optical transmission line; and a multiplexer which multiplexes n kinds of light to be amplified and the pump light output from the pump light generator, and outputs the multiplexed light to the optical transmission line, and wherein, when a center wavelength of the n kinds of light to be amplified is denoted as $\lambda_{S1}$ to $\lambda_{Sn}$ and a zero-dispersion wavelength of the optical transmission line is denoted as $\lambda_0$, intensity of the pump light generated by the pump light generator at n kinds of wavelengths ranging from $2\times\lambda_0-\lambda_{S1}$ to $2\times\lambda_0-\lambda_{Sn}$ is suppressed in comparison to intensity of other wavelengths of the pump light generated by the pump light generator.

10. A distributed optical amplifier system comprising an optical transmitter which transmits n kinds (n is a positive integer) of signal light, a distributed optical amplifier which amplifies the signal light transmitted by the optical transmitter in an optical transmission line as light to be amplified, and an optical receiver which receives the signal light amplified by the distributed optical amplifier, wherein the distributed optical amplifier comprises a pump light generator which generates pump light for optically exciting an optical transmission line; and a multiplexer which multiplexes n kinds of light to be amplified and the pump light output from the pump light generator, and outputs the multiplexed light to the optical transmission line, wherein the optical transmission line from the distributed optical amplifier to the optical receiver is configured by connecting a plurality of optical waveguides having different wavelength dispersions in columns, and wherein, when a center wavelength of the n kinds of light to be amplified is denoted as $\lambda_{S1}$ to $\lambda_{Sn}$ and a zero-dispersion wavelength of the optical waveguide at which intensity of the propagating pump light is the highest among the plurality of optical waveguides is denoted as $\lambda_{0in}$, intensity of the pump light at n kinds of wavelengths ranging from $2\times\lambda_{0in}-\lambda_{S1}$ to $2\times\lambda_{0in}-\lambda_{Sn}$ is suppressed in comparison to intensity of other wavelengths of the pump light generated by the pump light generator.

11. A distributed optical amplification method comprising:

generating pump light for optically exciting an optical transmission line; and multiplexing n kinds (n is a positive integer) of light to be amplified and the pump light output, and outputting the multiplexed light to the optical transmission line, wherein, when a center wavelength of the n kinds of light to be amplified is denoted as $\lambda_{S1}$ to $\lambda_{Sn}$ and a zero-dispersion wavelength of the optical transmission line is denoted as $\lambda_0$, intensity of the pump light generated at n kinds of wavelengths ranging from $2\times\lambda_0-\lambda_{S1}$ to $2\times\lambda_0-\lambda_{Sn}$ is suppressed in comparison to intensity of other wavelengths of the pump light generated.

* * * * *